United States Patent [19]
Wheeler

[11] 3,861,691
[45] Jan. 21, 1975

[54] PACKING MEMBER
[75] Inventor: John H. Wheeler, Dallas, Tex.
[73] Assignee: The Texacone Co., Dallas, Tex.
[22] Filed: June 6, 1973
[21] Appl. No.: 367,522

Related U.S. Application Data
[63] Continuation of Ser. No. 208,803, Dec. 16, 1971, abandoned.

[52] U.S. Cl. ................................................ 277/205
[51] Int. Cl. ............................................ F16j 15/32
[58] Field of Search.... 277/205, 124, 206 R, 207 R, 277/119

[56] References Cited
UNITED STATES PATENTS
2,475,967  7/1949  Jeske ................................ 277/205
3,271,038  9/1966  Bastow ............................. 277/205
3,627,335  12/1971  Wheeler ........................... 277/205

Primary Examiner—Samuel B. Rothberg
Attorney, Agent, or Firm—Richards, Harris & Medlock

[57] ABSTRACT

A packing member comprises an annular body having inner and outer sealing lips extending from it. A plurality of holes extend axially into the body from spaced points along a circle concentric with the body. The member may be split along a line extending through at least two angles axially of the body, if desired.

1 Claim, 12 Drawing Figures

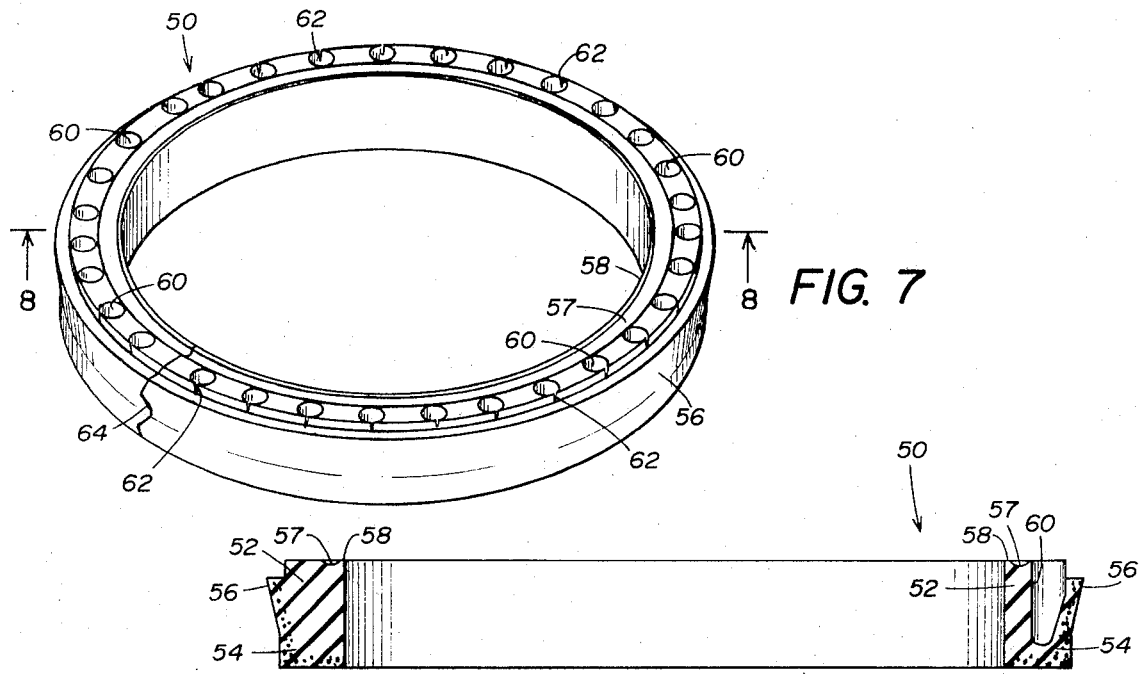
FIG. 7
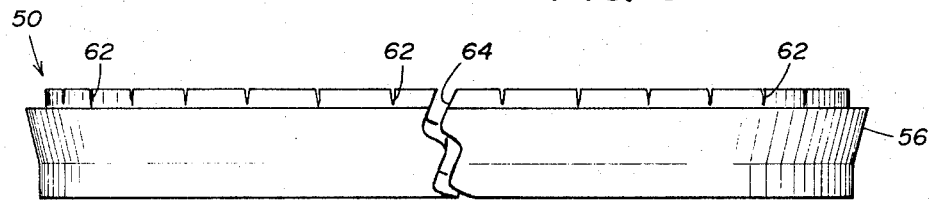
FIG. 8
FIG. 9
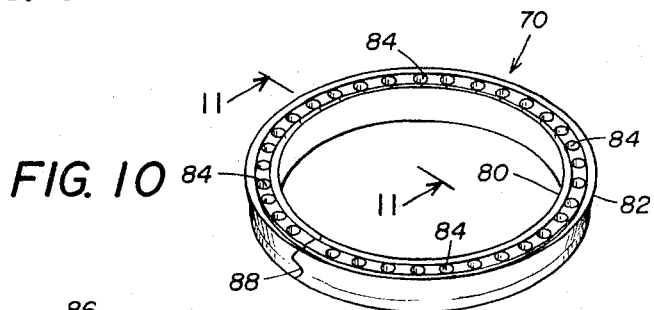
FIG. 10
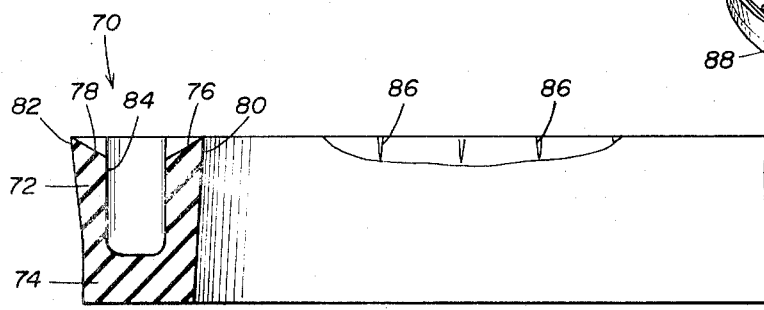
FIG. 11
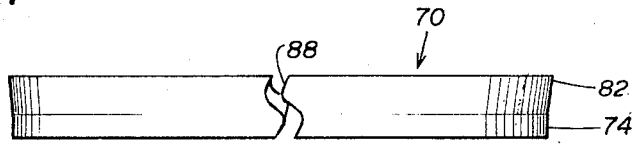
FIG. 12

000
PACKING MEMBER

CROSS REFERENCE TO RELATED APPLICATION

This application is a continuation of earlier filed copending application Ser. No. 208,803, filed Dec. 16, 1971, now abandoned.

BACKGROUND AND SUMMARY OF THE NEW INVENTION

In mechanical devices it is frequently necessary to form a seal at the point of intersection of various walls, etc. and shafts or other cylindrical members extending therethrough. One method of forming such a seal is to position a packing member between the two members. Typically, packing members include inner and outer sealing lips and are mounted with the lips facing the high pressure side of the intersection.

In the past, most packing members have comprised ring-shaped members having V-shaped or truncated V-shaped cross sections. The present invention relates to an improved packing member in which the inner and outer sealing lips may be either axially offset from each other or aligned. A plurality of holes extend axially into the member to reduce pressure concentrations and to permit the member to operate as a radial spring. The packing member may be cut along a wavy line to permit installation, if desired.

DESCRIPTION OF THE DRAWINGS

A more complete understanding of the invention may be had by referring to the following Detailed Description when taken in conjunction with the Drawings, wherein:

FIG. 7 is a perspective view of a third embodiment of the invention;

FIG. 8 is a sectional view taken generally along the line 8—8 in FIG. 7;

FIG. 9 is a side view of the embodiment shown in FIG. 7;

FIG. 10 is a perspective view of a fourth embodiment of the invention;

FIG. 11 is an enlarged sectional view taken generally along the line 11—11 in FIG. 10; and FIG. 12 is a side view of the embodiment shown in FIG. 10.

DETAILED DESCRIPTION

Figure 1:
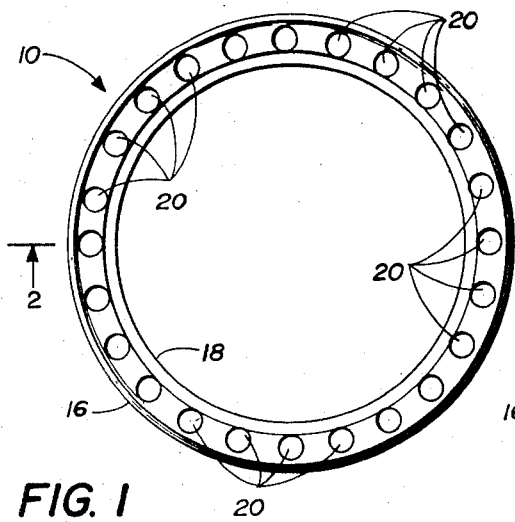
FIG. 1 is a bottom view of a first embodiment of the invention.
Figure 2:
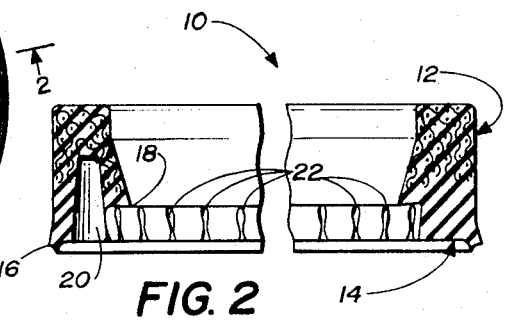
FIG. 2 is a transverse sectional view taken generally along the line 2—2 in FIG. 1.
Figure 3:
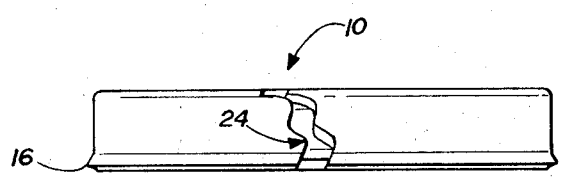
FIG. 3 is a side view of the embodiment shown in FIG. 1.

Referring now to the Drawings, and particularly to FIGS. 1, 2 and 3, a first embodiment of the invention is shown. The first embodiment comprises a packing member 10 including an upper portion 12 and a lower portion 14. The packing member 10 is integrally formed from an elastic material such as rubber, plastic, etc. The upper portion 12 and the lower portion 14 are, however, made relatively rigid and relatively resilient, respectively, by forming the upper portion 12 around a body of reinforcing material, such as cloth.

The packing member 10 has an outer sealing lip 16 formed along its outer surface at the lower edge thereof and has an inner sealing lip 18 formed around its inner surface at a point near its axial center. In use, the packing member 10 is positioned at the point of intersection of a cylindrical member such as a shaft and a wall such as a housing. The packing member 10 is mounted with the lips 16 and 18 facing the high pressure side of the intersection and in engagement with the housing and the cylindrical member, respectively.

The packing member 10 also has a plurality of holes 20 formed in it. The holes 20 extend axially into the member 10 from equally spaced points along a circle extending around the bottom of the member. Each hole 20 extends through the lower portion 14 of the member 10 and into the upper portion 12, thereof. Each hole 20 also extends through the inner surface of the lower portion 14 to form an opening 22.

The holes 20 play several very important functions in the operation of the packing member 10. First, the holes 20 allow the material of the packing member 10 to distribute itself more uniformly as the packing member is used. This permits the packing member 10 to form a more effective seal. Second, the holes 20 reduce stress concentrations in the packing member 10 and thereby reduce the wear of the packing member. Third, the holes 20 permit the packing member 10 to operate as a radial spring. This permits the packing member 10 to absorb a certain amount of eccentricity between a cylindrical member and a wall.

In many applications, the packing member 10 is employed in multiple. That is, a plurality of packing members are mounted adjacent each other in a stuffing box or the like. In such a case, the openings 22 formed by the holes 20 provide access to the holes 20. In other words, the openings 22 prevent the upper end of one packing member from blocking the holes 22 of the next adjacent packing member.

It is preferable that the packing member 10 comprise a continuous annulus since such a packing member is less likely to leak. However, in some situations it is necessary to split the packing member in order to permit its installation between cylindrical members and walls that cannot be readily disassembled. Referring specifically to FIG. 3, the packing member 10 is preferably cut along a wavy line 24 for use in split-ring applications. The line 24 extends through three angles axially of the member 10 and at an angle radially thereof. It has been found that such a split is far superior to the simple radial or diagonal splits that are conventionally employed in packing members.

Figure 4:
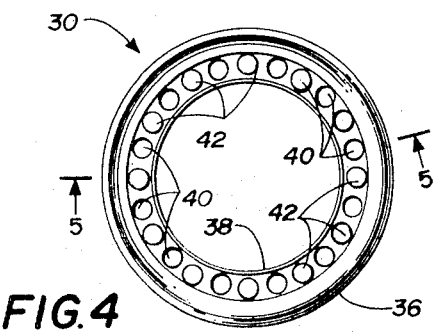
FIG. 4 is a bottom view of a second embodiment of the invention.
Figure 5:
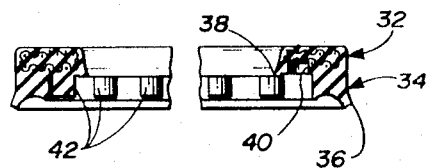
FIG. 5 is a sectional view taken generally along the line 5—5 in FIG. 4.
Figure 6:
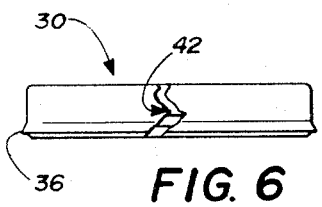
FIG. 6 is a side view of the embodiment shown in FIG. 4.

Referring now to FIGS. 4, 5 and 6, a second embodiment of the invention is shown. The second embodiment comprises a packing member 30 including a relatively rigid upper portion 32 and a relatively flexible lower portion 34. The packing member 30 is similar to the packing member 10 in that it has an outer sealing lip 36 formed along its outer surface at the lower edge thereof and has an inner sealing lip 38 formed along its inner surface at a point near its axial center.

The packing member 30 is further similar to the packing member 10 in that it has a plurality of holes 40 extending into it. The member 30 differs from the member 10 in that the holes 20 extend axially into the member 30 from equally spaced points around the lower surface of the upper portion 32. That is, the holes 40 do not extend through the lower portion 34 of the member 30. The member 30 also differs in the member 10 in that it includes a plurality of projections 42 which extend axially from the bottom of the upper member 32 at points positioned between the holes 40 formed therein.

In use, the packing member 30 is positioned between a cylindrical member and a wall to form a seal therebetween. The holes 40 in the member 30 function similarly to the holes 20 of the member 10 to promote uniform distribution of the material of the packing member, to reduce the pressure concentrations and to permit the member 30 to act as a radial spring. The projections 42 function to provide separation and to assure access to the holes 40 when the packing member 30 is used in multiple. As is shown in FIG. 6, the packing member 30 is preferably split along a wavy line 44 that extends through two angles axially of the member for use in split-ring applications.

It is convenient to consider a packing member constructed according to either of the first two embodiments of the present invention as comprised of two annular bodies. The first annular body is rectangular in cross section and is relatively rigid. An inner sealing lip extends from the inner edge of one end of the first annular body. The second annular body extends from the one end of the first annular body, is rectangular in cross section and is relatively resilient. An outer sealing lip extends from the outer edge of the second annular body that is remote from the first annular body. So considered, it will be seen that the first and second embodiments of the invention are similarly constructed except for the relative dimensions of the annular bodies comprising the two embodiments.

The first two embodiments of the invention differ principally in that in the first embodiment, the holes extend through the second annular body and into the first annular body, whereas in the second embodiment the holes are formed entirely in the first annular body. Another difference is that in the first embodiment, access to the holes is provided through the openings 22 in the inner walls of the second annular body whereas in the second embodiment access to the holes is assured by the projections 42. These differences in form between the first two embodiments do not, however, cause the two embodiments to operate differently.

Referring now particularly to FIGS. 7, 8 and 9, a third embodiment of the invention is shown. The third embodiment comprises a packing member 50 including an upper portion 52 and a lower portion 54. The packing member 50 is integrally formed from an elastic material such as rubber, plastic, or the like. The upper portion 52 and the lower portion 54 are, however, made relatively resilient and relatively rigid, respectively, by forming the lower portion 54 around a body of reinforcing material, such as cloth.

The packing member 50 has an outer sealing lip 56 formed along its outer surface at a point below its upper end, and has a groove 57 formed in its upper surface to define an upper lip 58. The packing member 50 is intended for use as a piston ring or the like, and in such use the packing member 50 is typically positioned in a groove formed in a piston. The packing member 50 is mounted with the lips 56 and 58 facing the high pressure side and functions to form a seal between the piston and the surrounding cylinder.

The packing member 50 also has a plurality of holes 60 formed in it. The holes 60 extend axially into the packing member 50 from equally spaced points along a circle extending around the top of the packing member. Each hole 60 extends through the upper portion 52 of the packing member 50 and into the lower portion 54 thereof. Each hole 60 also extends through the outer surface of the upper portion 52 to form an opening 62.

The holes 60 serve several important functions in the operation of the packing member 50. First, the holes 60 allow the material in the packing member 50 to distribute itself more uniformly as the packing member is used. This permits the packing member 50 to form a more effective seal. Second, the holes 60 reduce stress concentrations in the packing member 50, and thereby substantially reduce wear of the packing member. Third, the holes permit the packing member to act as a radial spring. This permits the packing member 50 to absorb a certain amount of eccentricity between a piston and a cylinder wall.

In certain applications it may be desirable to employ the packing member 50 in multiple. That is, two or more packing members may be mounted adjacent one another in the groove of a piston or in similar installations. In such a case the openings 62 formed by the holes 60 provide access to the holes 60. By such means the lower end of one packing member is prevented from blocking the holes 62 of the next adjacent packing member.

It is preferable that the packing member 50 comprise a continuous annulus since such a design is less likely to leak. However, in certain situations it is necessary to split the packing member in order to facilitate its installation in the groove of a piston. Referring specifically to FIG. 9, the packing member 50 is preferably cut along the wavy line 64 for use in split-ring applications. The line 64 extends through three angles axially of the member 50 and at an angle radially thereof. It has been found that such a split configuration is far superior to the radial and/or diagonal splits that have heretofore been employed in packing members.

Referring now to FIGS. 10, 11, and 12, a fourth embodiment of the invention is shown. The fourth embodiment comprises a packing member 70 including an upper portion 72 and a lower portion 74. A pair of grooves 76 and 78 are formed in the upper end of the packing member 70 to define inner and outer sealing lips 80 and 82 which extend around the packing member 70 at the outer upper edge and at the inner upper edge, respectively. As is best shown in FIG. 11, the grooves 76 and 78 are substantially V-shaped in cross section and each comprises a substantially axially extending surface and an angularly extending surface which extends from the axially extending surface to an intersection with an edge of the packing member 70.

The packing member 70 has a plurality of holes 84 formed in it which extend through the upper portion 72 of the packing member and into the lower portion 74 thereof. The holes 84 extend axially relative to the packing member and are positioned at spaced points along a circle extending around the top of the packing member and equally spaced between the grooves 76 and 78. As is most clearly shown in FIG. 10, the holes 84 are positioned at equally spaced points on the circle unless the packing member is to be split, in which case one of the holes 84 is omitted. As is best shown in FIG. 11, the holes 84 extend through the inner walls defining the grooves 76 and 78 to form apertures 86 therein.

The packing member 70 is adapted for service either as a piston ring or as a shaft seal. In either event the sealing lips 80 and 82 are positioned toward the high pressure side. During either use of the packing member 70, the holes 84 function to promote uniform distribution of the packing member, to reduce pressure concentrations, and to permit the packing member to act as a radial spring. In the event the packing member 70 is used in multiple, the apertures 86 function to prevent the lower end of one packing member from sealing the holes 84 in the next adjacent packing member.

The packing member 70 preferably comprises a single annulus so as to provide maximum protection against leaks. However, if the use of a split packing member is dictated by a particular application, the packing member 70 is preferably split along the wavy line 86 of the type shown in FIG. 12. Such a split extends through at least three angles axially of the packing member and also extends angularly relative to the radius of the packing member. It has been found that such a split performs in a very superior manner compared to the types of slits that have been used heretofore in split-ring applications.

From the foregoing it will be understood that whereas the packing members illustrated in the Drawings have numerous similarities, there are also numerous differences therebetween. Many of these differences are necessitated because the various embodiments of the invention are intended for use in different applications. Thus, the first and second embodiments of the invention are primarily intended for use as shaft seals. The third embodiment of the invention is virtually identical to the first embodiment but differs therefrom somewhat because it is designed for use as a piston ring. The fourth embodiment of the invention is intended for use either in the shaft seal or as a piston ring, and therefore may be considered to be a universal seal.

Although preferred embodiments of the invention have been illustrated in the accompanying Drawings and described in the foregoing specification, it will be understood that the invention is not limited to the embodiments disclosed, but is capable of numerous arrangements, modifications, and substitutions of parts and elements without departing from the spirit of the invention.

What is claimed is:

1. A packing member comprising:

an annular body defined by a generally right circular cylindrical outer wall, a generally right circular cylindrical inner wall, a generally radially extending, substantially flat upper wall extending between the inner and outer walls at the upper ends thereof, and a generally radially extending, substantially flat lower wall extending between the inner and outer walls at the lower ends thereof;

said annular body having a pair of oppositely sloping end faces defining a pair of concentric grooves formed in the upper wall thereof to define a pair of aligned inner and outer sealing lips located at the intersections of the upper wall and the inner and outer walls, respectively;

said annular body further having a plurality of circular holes formed in the upper wall each extending axially into said wall from equally spaced points concentric with and located between the grooves;

each of said holes tangentially intersecting both of said grooves to form slot-shaped openings interconnecting the holes and the grooves;

said circle of axially extending holes being centered between the inner and outer walls of the body;

said grooves being equally and oppositely spaced relative to the holes and having generally wedge-shaped cross sections each characterized by a substantially axially extending surface adjacent the holes and an angularly extending surface comprising said sloping end face intersecting said body at the intersection of the upper wall and the adjacent wall.

* * * * *